Nov. 29, 1938.  F. D. JONES  2,138,604
BALER
Filed Dec. 26, 1934
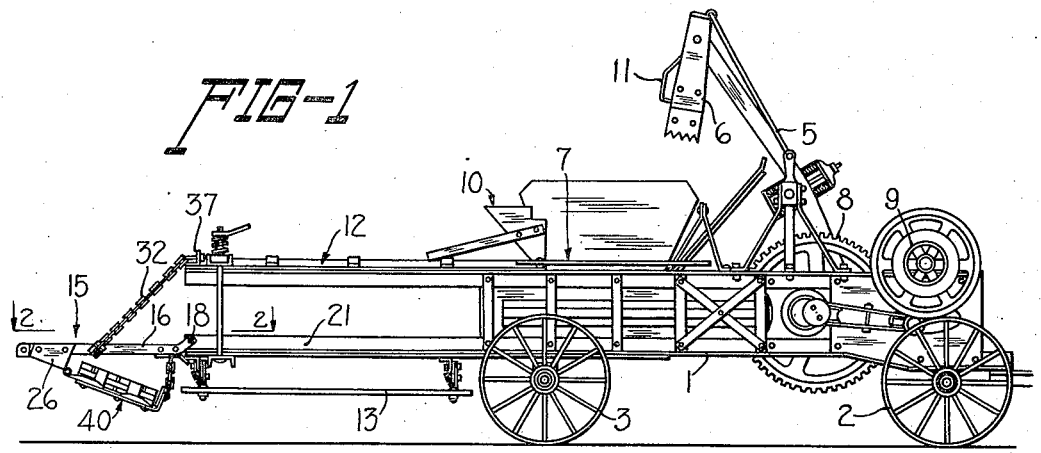
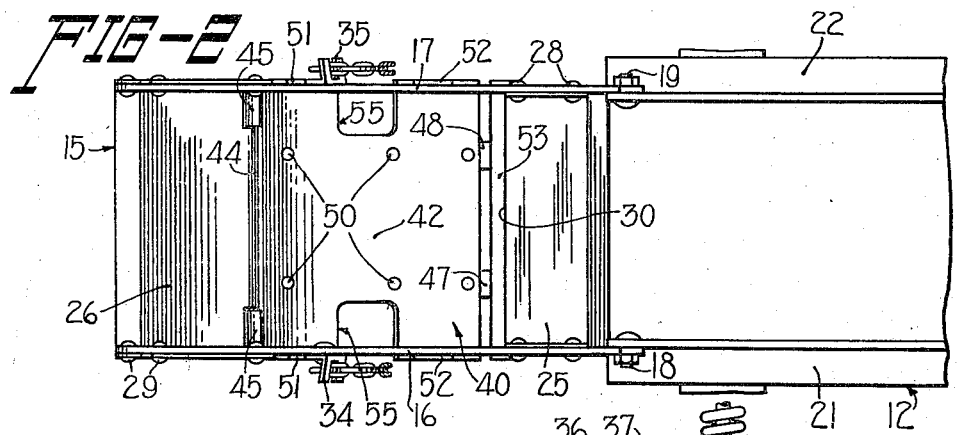
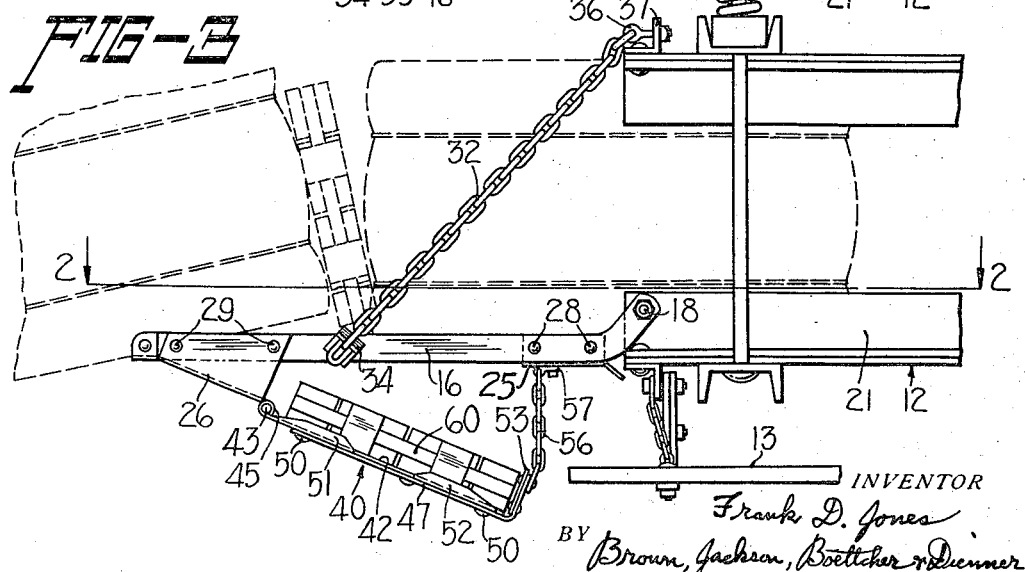
INVENTOR
Frank D. Jones
BY Brown, Jackson, Boettcher & Dienner
ATTORNEYS.

Patented Nov. 29, 1938

2,138,604

UNITED STATES PATENT OFFICE 2,138,604

BALER

Frank D. Jones, Ottumwa, Iowa, assignor to Dain Manufacturing Company of Iowa, Ottumwa, Iowa, a corporation of Iowa Application December 26, 1934, Serial No. 759,166

20 Claims. (Cl. 100—19)

The present invention relates generally to hay balers or hay presses for condensing or compacting straw, hay and other fibrous material of considerable bulk into a compact form. Generally such machines comprise suitable feeding mechanism for delivering charges of the material into a press chamber in which a ram or plunger is movable for compressing or compacting the charges of material into a bale, in connection with suitable means providing for the deposition of division blocks at more or less regular intervals for the purpose of separating the compressed material into separate bales which while under compression are fastened with suitable bale ties. In the usual type of hay press, the ties are inserted as the bales pass through a bale case, and after the bales are forced from the latter, the division blocks, separating the bales, drop to the ground and are retrieved for subsequent use.

The principal object of the present invention is the provision of means for catching and retaining the division blocks as they drop from between the completed bales as they are successively discharged from the machine, thereby preventing the division blocks from falling to the ground, and serving to retain them in a position easily accessible for removal when needed again. More specifically, it is an object of the present invention to provide such a means for a baler of the windrow type, that is, one which is adapted to be drawn along a windrow or between cocks and to be continually fed material during the travel of the machine over the field. Heretofore, so far as I am aware, no means has ever been provided for catching and retaining the division blocks as the bales fall free of the machine at the rear end thereof. They have always been permitted to fall to the ground, and in the case of a windrow baler, it was necessary for the attendant riding the running board of such a machine at the rear end of the latter to keep close watch on the division blocks and be ready to retrieve them at the moment each completed bale left the machine. If the operator were not there at the moment that the division block dropped, it would be necessary for him to leave the machine, run back and get the block, and then catch up with the machine again. By virtue of the principles of the present invention, a division block retainer is provided which catches the division block as each completed bale falls free of the machine. As a result, it is no longer necessary for the attendant riding the running board of the baler, such as a baler of the windrow type, to watch the division block, and he may therefore pay more attention to his other tasks and can pick the division block out of the retainer at the time that it is needed.

More specifically, it is an object of the present invention to provide a hay baler or press with a tail board, over which the completed bales are ejected, having an opening therein, and to carry on the tail board or connect therewith the division block receiving means in such a position as to catch the blocks as they drop through the opening in the tail board.

Another object of the present invention is to provide the tail board with an inclined plate section and to also incline the division block receiving means, in a downward and forward direction, this being the approximate position of each division block as the completed bale just ahead tips or tilts off the rear end of the tail board and falls free of the machine. This angular disposition appreciably facilitates the division block sliding into the retainer and out of the way of the next succeeding bale. In this connection, it is a further object of the present invention to provide shouldered means behind which the division block rests in the block retainer so that any contact between the moving bales and a block resting in the retainer will not cause the block to be shifted upwardly into the path of movement of the completed bales.

It is a further object of the present invention to pivotally connect the division block receiving means to the tail board so that if the front end of the machine tilts upwardly or a rise in the ground is encountered by the block retainer, it can swing upwardly out of the way without damaging the machine. Usually, the tail board of the machine is similarly pivoted to the rear or discharge end of the bale case.

These and other objects and advantages of the present invention will be apparent to those skilled in the art after a consideration of the following detailed description of the preferred embodiment, illustrated in the accompanying drawing.

In the drawing:

Figure 1 is a side view of the hay press or hay baler embodying the principles of the present invention;

Figure 2 is an enlarged top view of the rear end of the machine shown in Figure 1; and Figure 3 is a side view of the portion of the machine shown in Figure 2, together with a showing of two completed bales in dotted lines with a division block interposed therebetween and showing the position they take at the moment that one of the bales tips off the rear end of the tail board and just prior to the moment that the division block drops into the block retaining means.

Referring now more particularly to Figure 1, the machine shown in this figure is of more or less conventional construction, embodying a suitable supporting framework 1 carried for transport on front and rear wheels 2 and 3. The mechanism of the baler comprises suitable feeding means 5 including vertical members 6 movable into and out of the press or baling chamber 7 in which is also movable a plunger or the like by which the material is compacted and which is actuated by suitable mechanism including an eccentric gear 8 driven in any desired manner by a drive pulley 9. The hay baler usually includes a block dropper indicated in its entirety by the reference numeral 10 and swingable into a position whereby the division block carried thereby is engaged by a block driver 11 carried by the feeding mechanism 5 and forced into position so as to divide the compressed charges into bales and during which the bales are forced rearwardly of the machine through a bale case 12 and out the rear end thereof. Where the machine is a baler of the windrow type, that is, one which is drawn along a windrow in the field, it is usual to provide a running board 13 upon which an operator can stand and tie the bales and oversee the transfer and placing of the division blocks.

The tail board of the machine is indicated in its entirety by the reference numeral 15 and comprises two side members 16 and 17 which are pivotally connected at 18 and 19 to the lower angle members 21 and 22 forming a part of the lower section of the bale case 12. Adjacent the pivots 18 and 19 the side members 16 and 17 are connected together by means of a plate 25, and at their ends the bars 16 and 17 are connected together by a plate 26 which, as best illustrated in Figures 1 and 3, is inclined downwardly and forwardly of the machine for a purpose which will appear later. Preferably, although not necessarily, the tail board plates 25 and 26 are secured, as by rivets 28 and 29, to the side bars or members 16 and 17. The space 30 between the plates 25 and 26 forms a division block receiving opening through which the blocks are adapted to drop between the side bars 16 and 17. The tail board 15 is normally held in a substantially horizontal position by a pair of chains 32, the lower ends being removably connected to bifurcated brackets 34 and 35, and the upper ends of chains 32 being connected by eye-bolts 36 to the transverse angle member 37.

The division block receiving means is indicated in its entirety by the reference numeral 40 and, as best shown in Figure 3, comprises a frame in the form of a plate 42 pivotally connected at its rear end to the forward edge of the downwardly and forwardly inclined plate 26. This pivotal connection is preferably formed by a rod 43 around which is bent an extension 44 on the forward edge of the plate 26 and extensions 45 on the rear end of the plate 42, as best shown in Figures 2 and 3. The division block retaining plate 42 is reenforced by two fore and aft extending members 47 and 48 which are riveted, as at 50, to the bottom of the plate 42. The sides of the latter plate are bent upwardly, as shown at 51 and 52, to prevent the division block from sliding out laterally, and the reenforcing members 47 and 48, at their forward ends, are bent upwardly and carry a transverse plate 53. At the sides of the retaining plate 42, openings or cut out portions 55 are provided to facilitate the removal of the division block from the retainer. The plate 42 is held in position, at about the same angle of inclination as the angle of the plate 26 carried by the tail board, by means of a pair of chains 56 secured to the bottom of the plate 25 and to the upwardly bent ends of the reenforcing strips 47 and 48, as best shown in Figure 3. The upper ends of the chains 56 are fixed to a bracket 57 for this purpose.

In the operation of the machine, the division blocks, indicated by the reference numeral 60, are inserted from time to time so as to separate the compressed and compacted material into separate bales, and then the bales are forced rearwardly through the bale case 12 and along the tail board 15. When a bale reaches the point where it overbalances over the rear end of the tail board 15, the division block between that bale and the next succeeding bale is freed, the bale and block being shown in dotted lines in Figure 3 to illustrate their position at this moment. The block 60 being freed, it will drop through the opening 30 between the side bars 16 and 17 of the tail board and will be caught by the division block retaining means 40. It will be apparent from Figure 3 that at the moment each division block is released, it occupies a position inclined downwardly and forwardly, in the same general direction as the inclination of the tail board plate 26 and the plate 42 of the division block receiving means 40. This appreciably facilitates the movement of the block into a position on the plate 42 and well out of the way of the next succeeding bale. The sections 44 and 45 of the pivot or hinge construction are so arranged that when the division block 40 is in position on the plate 42, they serve as a shoulder along the upper edge of the division block retainer for the purpose of preventing the division block being forced out of the retainer 40 by contact with the succeeding bale as shown in Figure 3. In leaving the bale case 12, the bale may extend down between the side members 16 and 17 of the tail board 15 and may come in contact with the upper rear edge of the division block 60 in the retainer. If no means were provided for preventing the division block from sliding rearwardly, it might be shifted rearwardly and upwardly into the path of the next succeeding bale. However, the shoulder formed by the sections 44 and 45 effectively holds the division block against any such displacement. Also, the pivoted connection, not only of the block receiving means 40 with the tail board but also of the tail board 15 to the rear end of the bale case, provides a construction wherein either or both may swing upwardly, in case the front end of the machine tilts upwardly to bring the rear end into contact with the ground or if a rise in the ground is encountered. In this way the provision of a division block retainer cannot operate to cause any damage to the rear end of the machine upon accidental contact with the ground.

While I have shown and described above the preferred form of the present invention, it is to be understood that my invention is not to be limited to the particular means shown and described but that, in fact, widely different means may be employed in the practice of the broader aspects of my invention.

What I claim, therefore, and desire to secure by Letters Patent is:

1. The combination with a baler of the type in which the individual bales are separated in the formation thereof by division blocks and in which the bales are successively ejected from a bale case, of means carried at the discharge end of said bale case for supporting the bale being ejected substantially until its rear end is free of the bale case, and means carried by said supporting means below the path of the bales and between the edge of the supporting means over which the bales are discharged and the end of the bale case for retaining the division block between said last mentioned bale and the next succeeding one as the discharge of said last mentioned bale is completed.

2. The combination with a baler of the type in which the individual bales are separated in the formation thereof by division blocks, of a tail board over which the completed bales are ejected, means supporting the tail board on the baler for movement with respect to the latter, and means connected with the tail board intermediate the ends of the latter and movable therewith for receiving the division blocks from between the bales as the latter are successively discharged over said tail board.

3. The combination with a baler of the type in which the individual bales are separated in the formation thereof by division blocks and having a bale case from which the completed bales are discharged, of a tail board connected at the discharge end of said bale case and provided with an opening therein, and division block receiving means carried by said tail board underneath said opening to receive said division blocks from between the bales as the latter are successively discharged from the bale case.

4. The combination with a baler of the type in which the individual bales are separated in the formation thereof by division blocks and including a bale case from which the completed bales are discharged, of a tail board connected at the discharge end of said bale case for supporting the bales during their ejection from the bale case, an opening formed in the central portion of the tail board through which the division blocks from between successive bales may drop, and means arranged in a downward and forwardly inclined position underneath the opening in said tail board for receiving the division blocks as they drop through said opening.

5. The combination with a baler of the type in which the individual bales are separated in the formation thereof by division blocks and including a bale case from which the completed bales are discharged, of a tail board connected with the bale case at the discharge end thereof and including an opening in the central portion thereof through which the division blocks may drop as the bales are successively ejected from the machine, and means pivotally connected with said tail board underneath said opening for receiving the division blocks as they drop therethrough.

6. The combination with a baler of the type in which the individual bales in the formation thereof are separated by division blocks, having a tail board over which the bales slide in leaving the baler, said tail board having an opening therein through which the division blocks may drop, a division block retainer for catching said blocks when the latter drop through said opening and comprising a frame pivotally connected at one end adjacent the rear end of said tail board, and means for suspending said frame in a downwardly and forwardly inclined position, said pivotal connection permitting said frame to swing upwardly.

7. The combination with a baler of the type in which the individual bales are separated in the formation thereof by division blocks and having a tail board over which the completed bales pass in leaving the baler, said tail board having an opening through which the division blocks may drop, of a division block retainer carried by said tail board and disposed underneath said opening to receive the blocks as they drop therethrough, and means associated with the block retainer and the tail board to prevent accidental contact of a bale with a block in said retainer from shifting the block up into the path of movement of said bales.

8. The combination with a baler of the type in which the individual bales in the formation thereof are separated by division blocks and having a tail board over which the completed bales pass in leaving the baler, said tail board having an opening therein through which the division blocks may drop, of a division block retainer for catching the blocks when the latter drop through said opening, and cooperating means carried by said tail board and said block retainer and forming hinge means connecting the latter with the tail board for suspending the block retainer in a position underneath said opening to receive said blocks, said hinge means forming a shoulder for preventing any displacement of a division block in said retaining means rearwardly by contact with the next succeeding bale.

9. The combination with a baler of the type in which the individual bales are separated in the formation thereof by division blocks and having a bale case from which the completed bales are discharged, of a tail board connected with the discharge end of said bale case and comprising a pair of frame bars pivotally connected with the bale case and bale supporting plates secured to said bars, one adjacent the pivot connections of said bars and the other adjacent the outer ends of the latter, there being an open space between said plates through which said division blocks may drop, and a division block retainer for catching said blocks when the latter drop through said opening, said retainer being connected at one end with said latter plate.

10. The combination with a baler of the type in which the individual bales are separated in the formation thereof by division blocks and having a bale case from which the completed bales are discharged, of a tail board connected with the discharge end of said bale case and comprising a pair of frame bars pivotally connected with the bale case and bale supporting plates, one connected with said bars adjacent the pivot connection of the latter and the other including a downwardly and forwardly inclined section connected with the outer ends of said bars, and a division block retainer pivotally connected with said inclined tail board plate and extending downwardly and forwardly therefrom for catching and retaining the division blocks as the latter drop through said opening during the successive discharge of bales from the bale case.

11. The combination with a baler of the type in which the individual bales are separated in the formation thereof by division blocks, of a tail board over which the bales pass in leaving the baler, said tail board having an opening in its central portion through which the division blocks may drop and a downwardly and forwardly inclined plate at the outer end of the tail board, a division block retainer pivotally connected at one end with said inclined plate for vertical swinging movement and arranged for catching said blocks when the latter drop through said opening, means suspending the other end of said retainer from said tail board so that said retainer is disposed at about the same angle as said inclined plate, and means forming a shoulder on said inclined plate to prevent a division block carried by said retainer from being drawn upwardly out of said retainer.

12. The combination with a baler of the type in which the individual bales in the formation thereof are separated by division blocks and having a tail board over the outer end of which the completed bales tip downwardly in being discharged from the baler, said tail board having an opening therein through which the division blocks may drop as each successive bale is ejected from the machine, of a division block retainer comprising a receptacle carried by said tail board underneath said opening and having a bottom wall inclined downwardly and forwardly in approximately the same general direction as the position of each division block after the bale being ejected tips over the outer end of the tail board and just prior to the time that the bale falls free from the tail board.

13. The combination with a baler of the type in which the individual bales are separated in the formation thereof by division blocks, of a tail board pivotally connected with the baler for upward movement with respect thereto and over which the completed bales are ejected, and means pivotally connected with the tail board for upward movement with respect thereto and arranged to be disposed below the tail board and the path of movement of the bales thereover and formed to catch and retain therein the division blocks from between the bales as the latter are successively discharged over said tail board.

14. The combination with a baler of the type in which the individual bales are separated in the formation thereof by division blocks, of a tail board over which the bales pass in leaving the baler, said tail board having an opening in its central portion through which the division blocks may drop and a plate at the outer end of the tail board, a division block retainer for catching said blocks when the latter drop through said opening, means pivotally connecting one end of said block retainer to said plate for vertical swinging movement, means supporting the other end of said retainer from said tail board, and means forming a shoulder on said plate to prevent a division block carried by said retainer from being drawn upwardly out of said retainer.

15. The combination with a baler of the type in which the individual bales are separated in the formation thereof by division blocks, of a tail board over which the bales pass in leaving the baler, said tail board having an opening in its central portion through which the division blocks may drop and a plate at the outer end of the tail board, a division block retainer for catching said blocks when the latter drop through said opening, said plates and said division block retainer having cooperating marginal portions, end means pivotally connecting said marginal portions together whereby the block retainer is capable of vertical swinging movement with respect to said plate, and means supporting the other end of said retainer on said tail board, the marginal portion of said plate being formed to serve as a shoulder for preventing a division block from being carried upwardly out of said retainer by the movement of the baler.

16. The combination with a baler of the type in which the individual bales are separated in the formation thereof by division blocks and which includes a bale case comprising upper and lower members, of a tail board pivotally connected at its inner end to the lower of said bale case members and over which the completed bales are ejected, supporting means connected between the tail board and the upper of said bale case members for holding the tail board in position, a block catcher for receiving the division blocks from between the bales as the latter are successively discharged over said tail board, means pivotally connecting the outer end of said block catcher with said tail board adjacent the outer end of the latter, and means connecting the inner end of said block catcher with said tail board adjacent the pivot connection of the latter with said lower bale case members.

17. The combination with a baler of the type having a bale case and in which the individual bales are separated in the formation thereof by division blocks, of a tail board extending rearwardly from the discharge end of the bale case and over which the completed bales are ejected, a division block retainer disposed in a position to receive the division blocks from between the bales as the latter are successively discharged over said tail board, and means connecting said division block retainer with the tail board for supporting the retainer in a position underneath the latter.

18. The combination with a baler of the type having a bale case and in which the individual bales are separated in the formation thereof by division blocks, of a tail board extending rearwardly from the discharge end of said bale case and upon which the completed bales move when ejected, and a division block retainer connected with the tail board and disposed in a position below the latter and extending toward its forward end for receiving the division blocks from between the bales as the latter are successively discharged over said tail board, said division block retainer being formed to provide for removing the blocks therefrom in a direction transversely of said tail board below the path of movement of the bales.

19. The combination with a baler of the type in which the individual bales are separated in the formation thereof by division blocks, of a tail board over which the completed bales are ejected, and a division block retainer connected with the tail board and disposed in a position for receiving the division blocks from between the bales as the latter are successively discharged over said tail board, said division block retainer being formed to provide for removing the blocks therefrom in a direction transversely of said tail board and having a cut-out portion at one side thereof to make a division block accessible for removal.

20. A baler of the type in which the individual bales are separated in the formation thereof by division blocks and comprising a bale case from which the completed bales are discharged, bale supporting means at the discharge end of said bale case and provided with an opening therein, and division block receiving means carried by said bale supporting means underneath said opening to receive said division blocks from between the bales as the latter are successively discharged from the bale case.

FRANK D. JONES.